US010393076B1

(12) United States Patent
Freeman et al.

(10) Patent No.: US 10,393,076 B1
(45) Date of Patent: Aug. 27, 2019

(54) TETHERED AIR INTAKE SNORKEL

(71) Applicant: Toyota Motor North America, Inc., Plano, TX (US)

(72) Inventors: Stephen E. Freeman, McKinney, TX (US); Jakin C. Wilson, Prosper, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/117,160

(22) Filed: Aug. 30, 2018

(51) Int. Cl.
*B60K 13/02* (2006.01)
*F02M 35/16* (2006.01)
*F02M 35/10* (2006.01)
*F02M 35/024* (2006.01)

(52) U.S. Cl.
CPC ........... *F02M 35/162* (2013.01); *B60K 13/02* (2013.01); *F02M 35/10144* (2013.01); *F02M 35/024* (2013.01); *F02M 35/10327* (2013.01)

(58) Field of Classification Search
CPC .. F02M 35/024; F02M 35/161; F02M 35/162; F02M 35/10144; F02M 35/10327; B60K 13/02
See application file for complete search history.

(56) References Cited

U.S. PATENT DOCUMENTS

| | | | | |
|---|---|---|---|---|
| 3,892,079 | A * | 7/1975 | Hirano | E02F 3/30 37/309 |
| 6,167,862 | B1 * | 1/2001 | Powell | F02M 35/021 123/198 E |
| 7,234,555 | B2 | 6/2007 | Khouw et al. | |
| 8,915,234 | B2 | 12/2014 | Gulke et al. | |
| 8,960,347 | B2 | 2/2015 | Bennett | |
| 9,683,527 | B2 | 6/2017 | Tallman | |
| 2008/0242213 | A1 * | 10/2008 | Mayer | B60K 13/02 454/275 |
| 2012/0152632 | A1 * | 6/2012 | Azuma | F02M 35/162 180/68.3 |
| 2014/0150384 | A1 * | 6/2014 | Bunnell | F02M 35/088 55/332 |
| 2015/0202955 | A1 * | 7/2015 | Powell | B60K 13/02 180/68.3 |
| 2015/0240760 | A1 * | 8/2015 | Lewington | F02M 35/10013 95/269 |
| 2016/0318386 | A1 * | 11/2016 | Boschi | A01B 76/00 |

(Continued)

*Primary Examiner* — Bryan A Evans
(74) *Attorney, Agent, or Firm* — Christopher G. Darrow; Darrow Mustafa PC

(57) ABSTRACT

A tethered air intake snorkel for a vehicle includes a snorkel head comprising a head sidewall defining a head air conduit, an air intake comprising an intake opening into the head air conduit on an intake end, and a head attachment flange; a snorkel body comprising a body sidewall defining a body air conduit, an outer attachment flange configured for mating engagement with and attachment to the head attachment flange on an outer end, and an inner attachment flange on an inner end; and a flexible tether that extends between a head attachment end and a body attachment end and is configured to tether the snorkel head to the snorkel body, the head attachment end configured for disposition within the head air conduit and attachment to the head sidewall, the body attachment end configured for disposition within the body air conduit and attachment to the body sidewall.

10 Claims, 4 Drawing Sheets

(56) References Cited

U.S. PATENT DOCUMENTS

2017/0130681 A1* 5/2017 Tallman ............ F02M 35/10013
2017/0130682 A1* 5/2017 Tallman ............ F02M 35/10013
2017/0130683 A1* 5/2017 Somerville ...... F02M 35/10013
2018/0319270 A1* 11/2018 Tier ...................... B60K 13/02

* cited by examiner

TETHERED AIR INTAKE SNORKEL

FIELD OF THE INVENTION

The embodiments disclosed herein relate generally to a tethered air intake snorkel for a vehicle, and more particularly to a tethered air intake snorkel having a selectively reversible snorkel head and a tether joining the snorkel head to a snorkel body.

BACKGROUND

Automotive vehicles, particularly various types of trucks, currently employ an air intake snorkel that is attached to the air intake system. The air intake snorkel generally serves to elevate the air intake of the vehicle from its usual location in the engine compartment under the vehicle hood to a more elevated position, such as, for example, an elevated position on the vehicle hood, A-pillar, or roof. An air intake snorkel is frequently used when the vehicle is designed for off-road use and is desirable to avoid the intake of liquid water (e.g. when the vehicle is crossing streams, rivers, or other bodies of water) or snow/ice or to reduce the intake of dust, dirt, mud or other objects in the external environment.

In its elevated external position, an air intake snorkel and its component parts are subject to occasional external forces applied from sudden acceleration/deceleration of the vehicle and/or the impact of external objects, such as water, ice, snow, rocks, tree branches and the like. In addition to functional requirements of the air intake snorkel, it is also important that the snorkel has an appealing aesthetic appearance to users, particularly as it affects and relates to the overall vehicle appearance.

In view of the above, it is very desirable to ensure that the air intake snorkel and its component parts are securely attached to one another and the vehicle while maintaining a desirable aesthetic appearance of the snorkel to users of the vehicle.

SUMMARY OF THE INVENTION

In one embodiment, a tethered air intake snorkel for a vehicle is disclosed. The tethered air intake snorkel includes a snorkel head comprising a head sidewall defining a head air conduit, an air intake comprising an intake opening into the head air conduit on an intake end, and a head attachment flange comprising an attachment opening into the head air conduit on an opposed end. The tethered air intake snorkel also includes a snorkel body comprising a body sidewall defining a body air conduit, an outer attachment flange comprising an outer opening into the body air conduit disposed on an outer end and configured for mating engagement with and attachment to the head attachment flange, and an inner attachment flange comprising an inner opening into the body air conduit disposed on an inner end. The tethered air intake snorkel further includes a flexible tether that extends between a head attachment end and a body attachment end and is configured to tether the snorkel head to the snorkel body, the head attachment end configured for disposition within the head air conduit and attachment to an inner surface of the head sidewall, the body attachment end configured for disposition within the body air conduit and attachment to an inner surface of the body sidewall.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
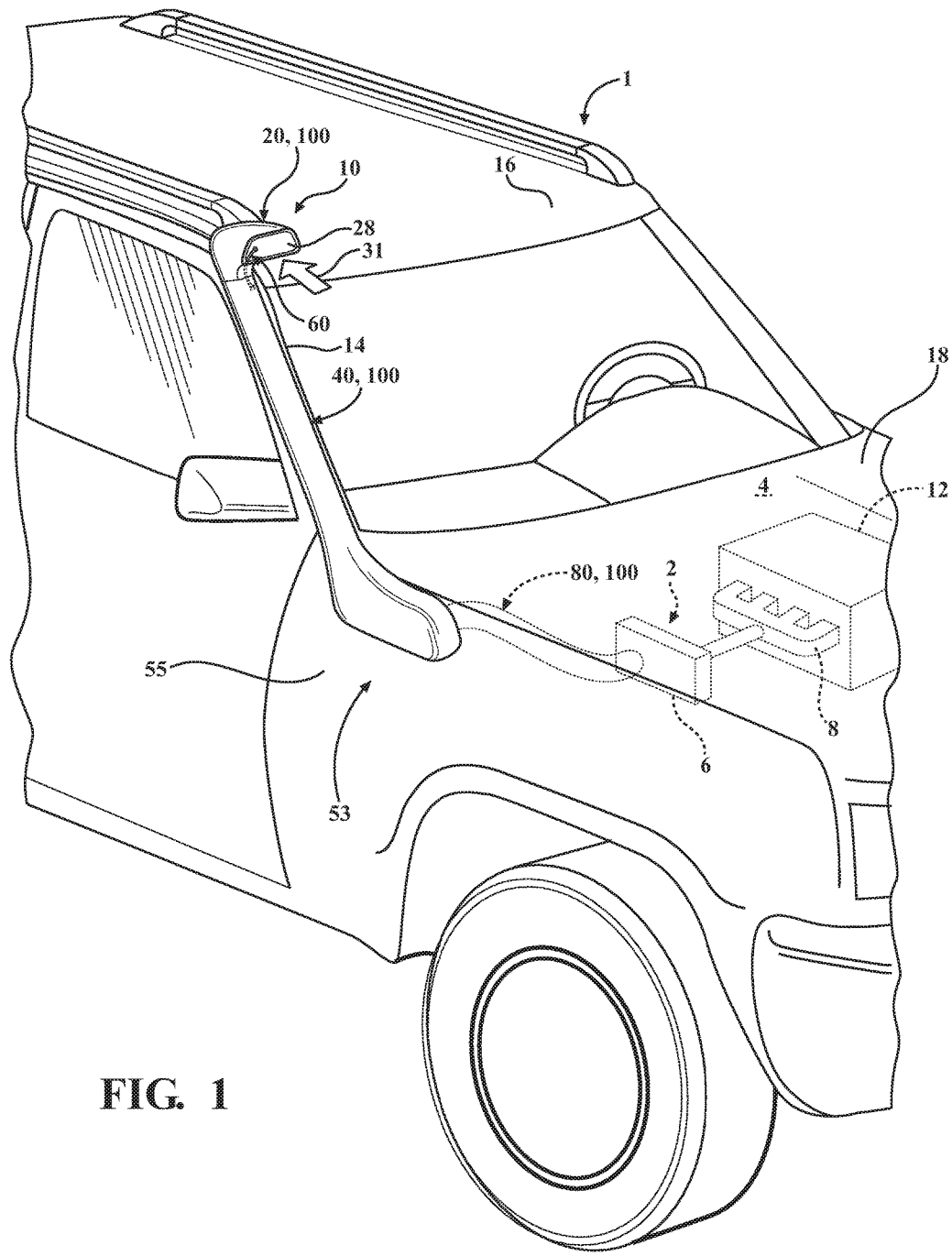
FIG. 1 is a perspective view of an exemplary embodiment of a tethered air intake snorkel and vehicle comprising the same, as described herein.

This invention comprises tethered air intake snorkels for various vehicles. The vehicles may include all manner of automotive vehicles, particularly various types of trucks, as well as other vehicles, such as various all-terrain vehicles (ATV's), utility-terrain vehicles (UTV's), and other off-road vehicles. These tethered air intake snorkels act as extensions of the associated air intake systems and elevate the air intakes from their usual locations under the vehicle hoods proximate the engines to more elevated positions, such as, for example, an elevated position on the vehicle hood, A-pillar, roof, or other elevated portion of the vehicle (e.g. roll bar structure). The tethered air intake snorkels are sealably joined to and in fluid communication with their associated air intake systems including their air intake air boxes and manifolds. The tethered air intake snorkels are desirable to prevent the intake of undesired foreign items into the air intake manifolds of the vehicles' internal combustion engines. Foreign items may include liquid water (e.g. when the vehicle is crossing streams, rivers, or other bodies of water), snow/ice, dust, dirt, mud, and other items.

Tethered air intake snorkels come in a variety of shapes and sizes and frequently comprise a plurality of components, including a snorkel head that includes the elevated air intake and a portion of the air intake conduit. The snorkel head is in turn sealably attached to and in fluid communication with an outer end of a snorkel body that provides the extension and elevation of the air intake conduit. This primary attachment of the snorkel head and snorkel body is accomplished by the engagement of corresponding mating flanges and a plurality of fasteners that join these flanges. The snorkel body is also attached on an opposed inner end to a vehicle body panel, such as a fender. The snorkel body is ultimately in fluid communication with the air intake system and airbox of the vehicle. In some embodiments the opposed inner end of the snorkel body may be attached to and in fluid communication with a second snorkel body that is disposed under the vehicle hood in the engine compartment. The second snorkel body is also an extension of the air intake conduit and is sealably attached on an outer end to the opposed inner end of the snorkel body and on an inner end is sealably attached to the air intake system and airbox of the vehicle.

In view of the off-road environments in which vehicles employing tethered air intake snorkels are frequently used, Applicants have discovered that it is very desirable to provide a secondary attachment of the snorkel head and the snorkel body in the form of a flexible tether attached to these members. In its elevated external position, an air intake snorkel, particularly the snorkel head and snorkel body, may be subject to external forces applied from sudden deceleration of the vehicle and/or the impact of external objects, such as water, ice, snow, rocks, tree branches, and other elements of the external environment, that may inadvertently cause the primary attachment of the snorkel head and body to become detached. Applicants have also discovered that an effective secondary attachment is provided by the flexible tether that is disposed within the air conduit and that extends between and is attached to inner surfaces of the snorkel head and snorkel body. Applicants have also discovered that in addition to providing an effective secondary attachment, the flexibility of the flexible tether allows the position of the snorkel head to be reversed from, for example, a forward facing in-vehicle position to a rearward facing in-vehicle position. The flexible tether also allows the snorkel head to be retained when it is occasionally removed for repair or replacement. Applicants have also discovered that in addition to the aforementioned functional benefits that the tethered air intake snorkel has an appealing aesthetic appearance to users, particularly as it affects and relates to the overall vehicle appearance, due to the fact that the flexible tether is hidden from view within the air intake conduit of the snorkel.

As used herein, the terms front or forward or rear or rearward or aft refer to the front or rear of the article or vehicle, or to a direction toward the front or rear of the article or vehicle, respectively. The term longitudinal or along the length refers to a direction that extends along an article or vehicle centerline between the front and the rear, or from one end to an opposed end. The term lateral or along the width or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle.

Figure 2:
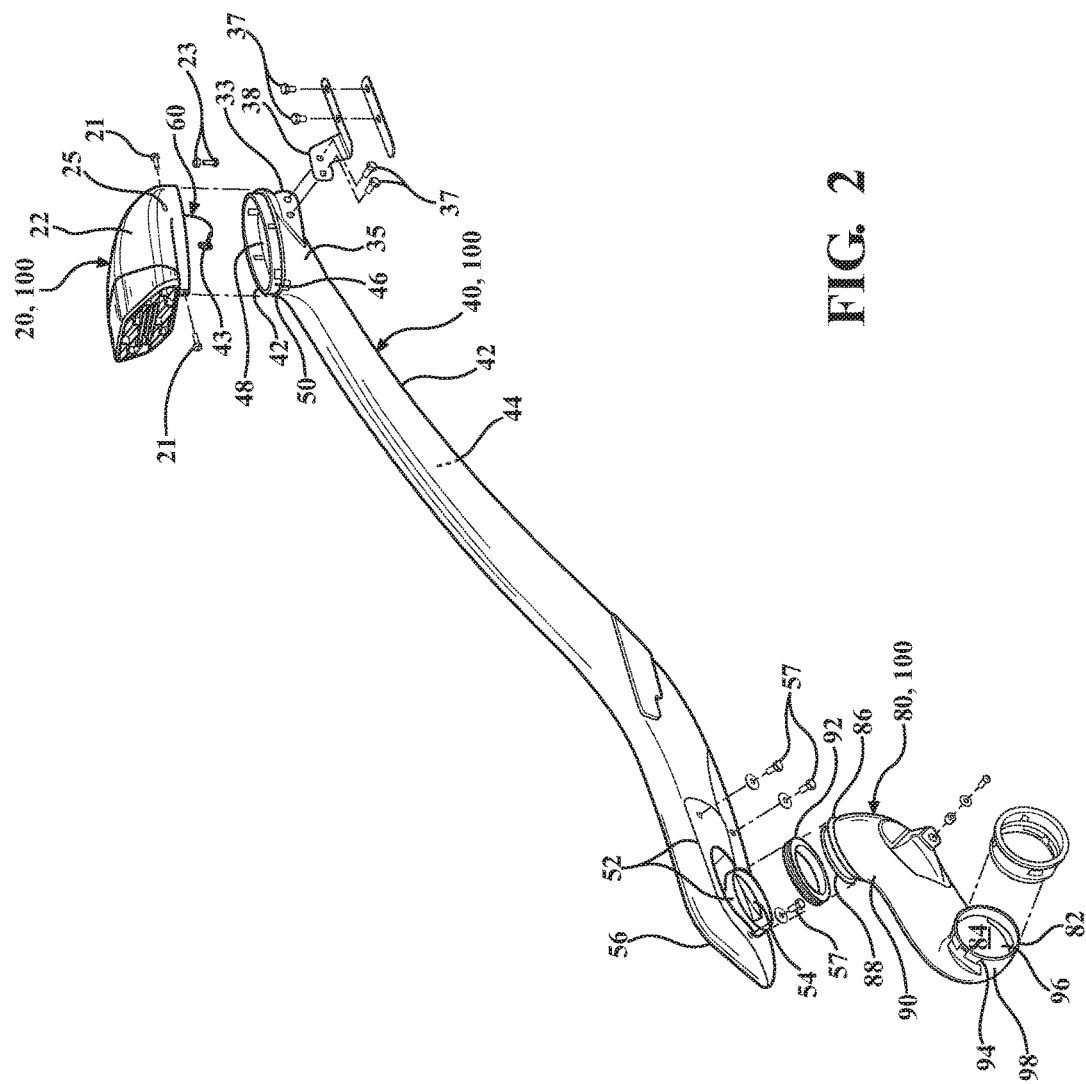
FIG. 2 is an exploded perspective view of an embodiment of a tethered air intake snorkel as described herein.

Referring to the Figures, and more particularly FIGS. 1-5, a tethered air intake snorkel 10 for a vehicle 1 is disclosed. As shown in FIGS. 1 and 2, in one embodiment, the tethered air intake snorkel 10 includes the snorkel head 20, snorkel body 40, and flexible tether 60. In one embodiment, the tethered air intake snorkel 10 comprising the snorkel head 20, snorkel body 40, and flexible tether 60 may also include the second snorkel body 80. The snorkel components 100 of tethered air intake snorkel 10 include the snorkel head 20, snorkel body 40 and second snorkel body 80. The snorkel components 100 may have any suitable shape or size needed to provide a sufficient supply of intake air for an internal combustion engine 12 of the vehicle 1. The snorkel components 100 may be formed from any suitable snorkel material, including suitable engineering plastics, metals, and glass fiber or carbon fiber composite materials. In one embodiment the snorkel components 1004 are formed from polypropylene. The snorkel components 100 may be sealably joined to one another by any suitable attachment and joining devices, including the use of various flanges, seals, and fasteners as described herein.

The tethered air intake snorkel 10, particularly the snorkel head 20 and snorkel body 40, are disposed in an elevated position (i.e. above) relative to the portion of the air intake system 2 that is disposed under the hood 18 in the engine compartment 4. The air intake system 2 comprises the intake air box 6 that may hold an air filter (not shown) that is attached to and in fluid communication with the intake air manifold 8 of the internal combustion engine 12. In the embodiment of FIG. 1, the tethered air intake snorkel 10 is disposed so that it extends upwardly proximate the passenger side A-pillar 14 and above the roof 16 of the vehicle 1. Alternately, the tethered air intake snorkel 10 may be disposed on or above the hood 18 or in other elevated locations on the vehicle 1. In the embodiment of FIGS. 1-5 the snorkel head 20 is reversible and is configured for reversible attachment to the snorkel body 40 in a first position or forward facing position facing a front of the vehicle 1 as shown in FIG. 1, as well as in a reversed (e.g. rotated 180° relative to the snorkel body) second position or rearward facing position (not shown) facing a rear of the vehicle, wherein the flexible tether 60 is configured to tether the snorkel head to the snorkel body in both the first position and the second position.

Figure 3:
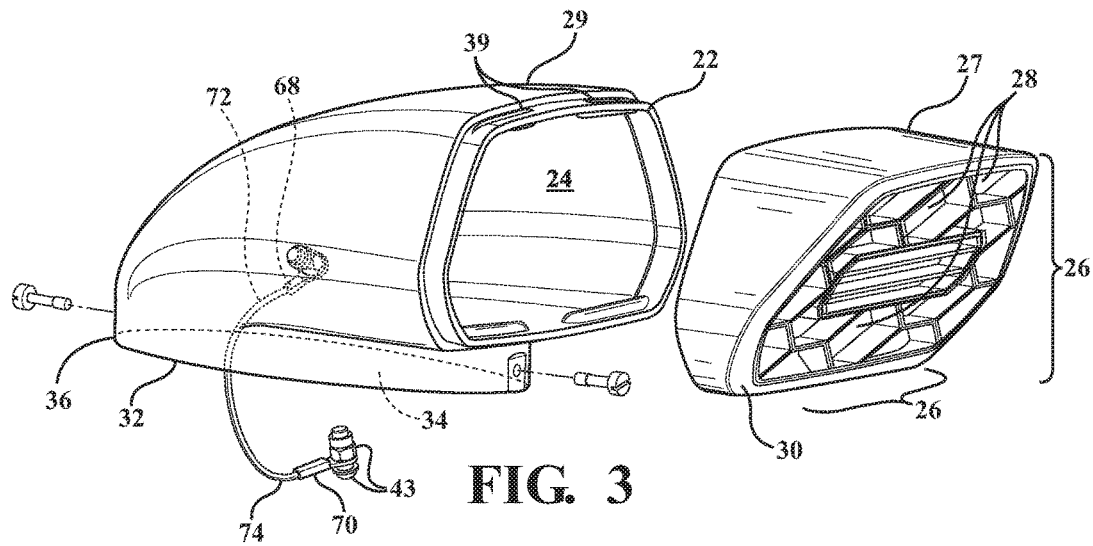
FIG. 3 is an exploded perspective view of the snorkel head and tether of FIG. 2.
Figure 4:
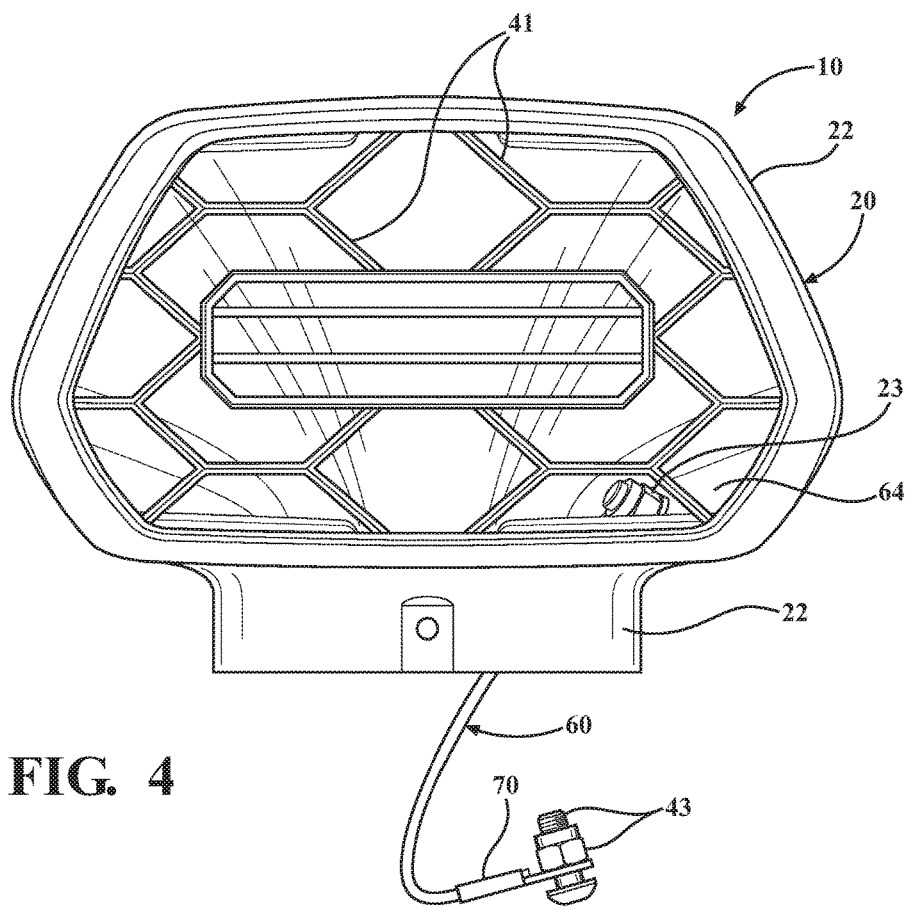
FIG. 4 is a front view of the snorkel head and tether of FIG. 2.
Figure 5:
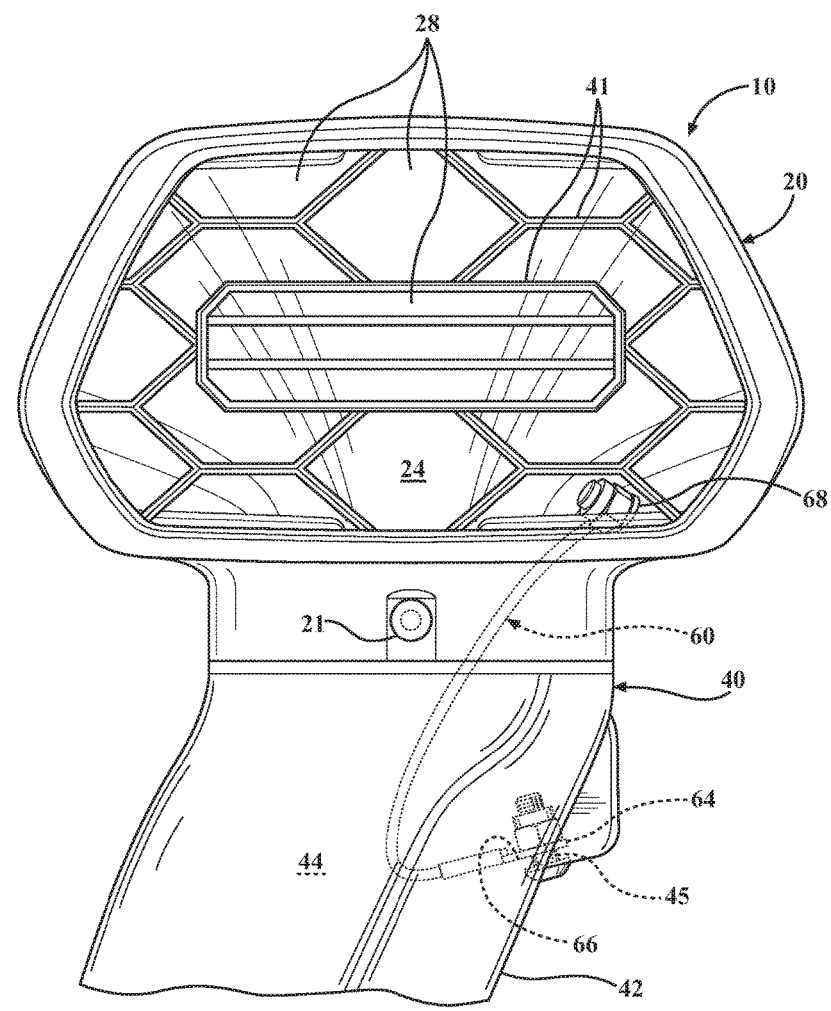
FIG. 5 is a front perspective view of the snorkel head, snorkel body and tether of FIG. 2 in an assembled condition with the tether attached to the snorkel head and snorkel body.

The tethered air intake snorkel 10 includes the snorkel head 20. The snorkel head 20 comprises the head sidewall 22 defining and enclosing the head air conduit 24. The snorkel head 20 includes the air intake 26 comprising the intake opening 28 into the head air conduit 24 on an intake end 30, which may also be referred to as a free end. The intake opening 28 may comprise the plurality of adjacent or interconnected openings 28 as shown in FIGS. 3-5, for example, that are separated by the network of interconnected ribs 41. The snorkel head 20 also includes the head attachment flange 32 comprising the attachment opening 34 into the head air conduit 24 on the opposed end 36. The head attachment flange 32 is configured for attachment to the snorkel body 40 by any suitable attachment device or mechanism, including the use of the plurality of threaded head fasteners 21. The head sidewall 22 may be configured for attachment to the flexible tether 60 by any suitable attachment device or mechanism, including the insertion of threaded head tether fasteners 23 (e.g. a threaded bolt and nut) in a conventional manner through the tether bore 25 (FIGS. 1, 4, and 5). The intake end 30 is configured to receive the intake airflow 31 that is directed through the respective air conduits of the snorkel components 100 into the air intake system 2 to provide combustion air for the internal combustion engine 12. The snorkel head 20 is configured for attachment to the roof 16 by the roof bracket 38 which is configured for attachment to the bracket flange 33 disposed on the outer surface 35 of the head sidewall 22 and the roof 16 using the plurality of bracket fasteners 37 (FIG. 2). In one embodiment, the snorkel head 20 may be formed as two pieces including the front portion 27 that includes the air intake 26 and the head portion 29 as shown in FIGS. 3 and 4 that are joined by snap-fit engagement using recesses 39 that correspond to tabs (not shown) in the mating flange portion of front portion 27. In other embodiments (not shown), the snorkel head 20 may be formed as single piece.

The tethered air intake snorkel 10 includes the snorkel body 40. The snorkel body 40 comprises the body sidewall 42 defining an body air conduit 44. The snorkel body 40 includes the outer attachment flange 46 encompassing and comprising the outer opening 48 into the body air conduit 44 disposed on the outer end 50 and configured for mating engagement with and attachment to the head attachment flange 32. The snorkel body 40 also comprises an inner attachment flange 52 that encompasses and includes the inner opening 54 into the body air conduit 44 disposed on the inner end 56. The outer attachment flange 46 is configured for attachment to the snorkel head 20 by any suitable attachment device or mechanism, including the use of the plurality of threaded head fasteners 21. The body sidewall 42 may be configured for attachment to the flexible tether 60 by any suitable attachment device or mechanism, including the insertion of the threaded body tether fasteners 43 through the tether bore 45 in a conventional manner. The outer end 50 is configured to receive the intake airflow 31 that is directed through the respective air conduits, including head air conduit 24, of the snorkel components 100 into the air intake system 2 to provide combustion air for the internal combustion engine 12. The inner attachment flange 52 of the snorkel body 20 is configured for attachment to the body panel 53 of the vehicle 1, such as front fender 554, on the inner end 56, using any suitable attachment device or mechanism, including the use of the plurality of threaded body fasteners 57 (FIG. 2) that are inserted through corresponding bores in the body panel (not shown) in a conventional manner.

The tethered air intake snorkel 10 includes the flexible tether 60. As used herein, flexible tether 60 as a noun means any flexible line, cable, strap, or similar device used to attach the snorkel head 20 to the snorkel body 40, and tether as a verb means to attach, fasten, confine, or otherwise retain the snorkel head 20 to the snorkel body 40 with the aforementioned tether. The flexible tether 60 extends between the head attachment end 72 and the body attachment end 74 and is configured to tether the snorkel head 20 to the snorkel body 40. The head attachment end 72 is configured for disposition within the head air conduit 24 and attachment to the inner surface 64 of the head sidewall 22. The body attachment end 74 is configured for disposition within the body air conduit 44 and attachment to the inner surface 66 of the body sidewall 42. In one embodiment, the flexible tether 60 comprises a flexible line, cable, or strap. The flexible tether 60 comprising a flexible line, cable, or strap may be formed from any suitable material, including a flexible metal, engineering plastic, or elastomer, including natural or synthetic rubber. In one embodiment, the flexible line, cable, or strap comprises stainless steel, including a stainless steel cable. The stainless steel cable may comprise any grade of stainless steel and any form of cable. In one embodiment, the stainless steel cable comprises a 7×19 wound stainless steel cable formed from type 304 stainless steel. The flexible tether 60 may have any suitable length, more particularly a length sufficient to allow the snorkel head 20 to be removed while tethered for maintenance or replacement or for reversing the installed position of the snorkel head. In one embodiment, the flexible tether has a length of 130 to 200 mm, more particularly 140 to 190 mm, and even more particularly 150 to 180 mm.

In one embodiment, the flexible tether 60 further comprises a head connector 68 and a body connector 70. The head connector 68 is disposed on the flexible tether 60, such as a line, cable or strap, at the head attachment end 72 and is configured for attachment to the head sidewall 22 on the inner surface 64. The body connector 70 is disposed on the flexible tether 60, such as a line, cable, or strap, at the body attachment end 74 and is configured for attachment to the body sidewall 42 on the inner surface 66.

In one embodiment, the tethered air intake snorkel 10, including the snorkel head 20, snorkel body 40, and flexible tether 60, further comprises the second snorkel body 80 comprising the second body sidewall 82 defining the second body air conduit 84. The second snorkel body 80 comprises the second outer attachment flange 86 comprising the second outer opening 88 into the second body air conduit 84 disposed on the outer end 90 and configured for sealable mating engagement with and attachment to the inner attachment flange 52 using the flexible seal 92. The second snorkel body 80 also comprises the second inner attachment flange 94 comprising the second inner opening 96 into the second body air conduit 84 disposed on the second inner end 98.

In one embodiment, of the vehicle 1 and the tethered air intake snorkel 10, the second snorkel body 80 is disposed under the hood 18 in the engine compartment 4 of the vehicle 1 and the second inner attachment flange 94 is configured for sealable, mating engagement with the intake air box 6 of the vehicle.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A tethered air intake snorkel for a vehicle, comprising:
a snorkel head comprising a head sidewall defining a head air conduit, an air intake comprising an intake opening into the head air conduit on an intake end, and a head attachment flange comprising an attachment opening into the head air conduit on an opposed end;
a snorkel body comprising a body sidewall defining a body air conduit, an outer attachment flange comprising an outer opening into the body air conduit disposed on an outer end and configured for mating engagement with and attachment to the head attachment flange, and an inner attachment flange comprising an inner opening into the body air conduit disposed on an inner end; and
a flexible tether that extends between a head attachment end and a body attachment end and is configured to tether the snorkel head to the snorkel body, the head attachment end configured for disposition within the head air conduit and attachment to an inner surface of the head sidewall, the body attachment end configured for disposition within the body air conduit and attachment to an inner surface of the body sidewall.

2. The tethered air intake snorkel of claim 1, wherein the flexible tether comprises a flexible line, cable, or strap.

3. The tethered air intake snorkel of claim 2, wherein the flexible line, cable, or strap comprises a metal or an engineering plastic.

4. The tethered air intake snorkel of claim 2, wherein the flexible line, cable, or strap comprises stainless steel.

5. The tethered air intake snorkel of claim 1, wherein the flexible tether further comprises a head connector and a body connector, the head connector disposed on the head attachment end and configured for attachment to the head sidewall, the body connector disposed on the body attachment end and configured for attachment to the body sidewall.

6. The tethered air intake snorkel of claim 1, wherein the flexible tether has a length of 130 to 200 mm.

7. The tethered air intake snorkel of claim 1, wherein the snorkel head is configured for reversible attachment to the snorkel body with the air intake in a first position facing a front of a vehicle or a second position facing a rear of the vehicle, and wherein the flexible tether is configured to tether the snorkel head to the snorkel body in the first position and the second position.

8. The tethered air intake snorkel of claim 1, wherein the inner attachment flange of the snorkel body is configured for disposition on and attachment to an outer surface of a vehicle body panel.

9. The tethered air intake snorkel of claim 1, further comprising a second snorkel body comprising a second body sidewall defining a second body air conduit, a second outer attachment flange comprising a second outer opening into the second body air conduit disposed on an outer end and configured for mating engagement with and attachment to the inner attachment flange, and a second inner attachment flange comprising a second inner opening into the second body air conduit disposed on a second inner end.

10. The tethered air intake snorkel of claim 9, further comprising a vehicle wherein the second snorkel body is disposed under a hood in an engine compartment of the vehicle and the second inner attachment flange is configured for mating engagement with an intake air box.

* * * * *